United States Patent [19]
O'Connell et al.

[11] Patent Number: 5,537,155
[45] Date of Patent: Jul. 16, 1996

[54] METHOD FOR ESTIMATING MOTION IN A VIDEO SEQUENCE

[75] Inventors: Kevin J. O'Connell; Cheung Auyeung, both of Palatine; Stephen N. Levine, Itasca, all of Ill.

[73] Assignee: Motorola, Inc., Schaumburg, Ill.

[21] Appl. No.: 236,753

[22] Filed: Apr. 29, 1994

[51] Int. Cl.$^6$ .................................................. H04N 7/32
[52] U.S. Cl. ........................................... 348/699; 348/416
[58] Field of Search ................................. 348/699, 413, 348/416, 402, 401, 409, 412, 415

[56] References Cited

U.S. PATENT DOCUMENTS

| | | | |
|---|---|---|---|
| 4,901,145 | 2/1990 | Harradine et al. | 358/105 |
| 4,924,310 | 5/1990 | von Brandt | 358/136 |
| 4,965,666 | 10/1990 | Haghiri | 358/105 |
| 4,989,087 | 1/1991 | Pele et al. | 358/136 |
| 4,992,869 | 2/1991 | Samad et al. | 348/699 |
| 5,068,722 | 11/1991 | Sugiyama | 358/105 |
| 5,068,724 | 11/1991 | Krause et al. | 358/133 |
| 5,072,293 | 12/1991 | De Haan et al. | 358/105 |
| 5,083,202 | 1/1992 | Parke | 358/105 |
| 5,089,887 | 2/1992 | Robert et al. | 358/105 |
| 5,105,271 | 4/1992 | Niihara | 358/133 |
| 5,111,511 | 5/1992 | Ishii et al. | 382/1 |
| 5,142,360 | 8/1992 | Niihara | 358/105 |
| 5,151,784 | 9/1992 | Lavagetto et al. | 358/136 |
| 5,173,772 | 12/1992 | Choi | 358/105 |
| 5,200,820 | 4/1993 | Gharavi | 358/105 |
| 5,210,605 | 5/1993 | Zaccarin et al. | 358/105 |
| 5,237,405 | 8/1993 | Egusa et al. | 358/105 |
| 5,278,915 | 1/1994 | Chupeau et al. | 382/1 |

OTHER PUBLICATIONS

ISO, "CD 11172-2: Coding of Moving Pictures and Associated Audio for Digital Storage Media at up to about 1.5 Mbits/s–Part 2 Video", Annex D (informative), pp. D-29-D-34, Apr. 3, 1992.

K. Rao and P. Yip, *Discrete Cosine Transform: Algorithms, Advantages, Applications*, Academic Press, 1990 pp. 247, 253.

Michael Gilge, "A High Quality Videophone Coder Using Hierarchical Motion Estimation and Structured Coding of the Prediction Error", SPIE Visual Communications and Image Processing 1988, pp. 864–874.

Primary Examiner—Tommy P. Chin
Assistant Examiner—A. Au
Attorney, Agent, or Firm—Darleen J. Stockley

[57] ABSTRACT

Efficient and adaptable motion estimation between flames in a video sequence is achieved in a video compression system 100 by first performing a series of comparisons in a first region between a present video block of a present video frame and a comparison video block of a previously stored video frame based on a first search point displacement pattern 500. Then, similar comparisons are performed in a second and third region based on a second and third search point displacement pattern respectively 501, 502. A best match video block is determined as a result of the series of comparisons 503. The series of comparisons may be made for a predetermined number of video blocks 600 and video statistics may be collected for the comparisons 601. If the video statistics are unfavorable 602 or if a predetermined time has expired 603, then the region used for searching for a best match block may be changed.

8 Claims, 5 Drawing Sheets

METHOD FOR ESTIMATING MOTION IN A VIDEO SEQUENCE

FIELD OF THE INVENTION

The invention generally relates to the field of video compression, and in particular, to estimating motion between frames in a video sequence.

BACKGROUND OF THE INVENTION

Video systems are known to include a plurality of communication devices and communication channels, which provide the communication medium for the communication devices. For example, the communication channel may be wireline connections or RF frequency carriers. To increase the efficiency of the video system, video that needs to be communicated is digitally compressed. The digital compression reduces the number of bits needed to represent the video while maintaining perceptual quality of the video. The reduction in bits allows more efficient use of channel bandwidth and reduces storage requirements. To achieve digital video compression, each communication device may include an encoder and a decoder. The encoder allows a communication device to compress video before transmission over a communication channel. The decoder enables the communication device to receive compressed video from a communication channel and render it visible. Communication devices that may use digital video compression include high definition television transmitters and receivers, cable television transmitters and receivers, video telephones, computers and portable radios.

Several standards for digital video compression have emerged, including International Telecommunications Union (ITU)-T Recommendation H.261, the International Standards Organization/International Electrotechnical Committee (ISO/IEC) 11172-2 International Standard (MPEG-1), and the forthcoming ISO/IEC 13818-2 standard (MPEG-2). These standards seek to efficiently represent a sequence of frames of video by exploiting the spatial and temporal redundancies in the video and by taking advantage of the perceptual qualities of the human eye. Temporal redundancy is exploited by estimating the motion in a sequence of frames.

Block matching algorithms are a known method for estimating motion within a video sequence. Each frame of the video sequence is divided into blocks of pixels. Block matching algorithms compare a current block that is to be encoded in one frame with blocks of the same size in a previous or future frame of the video sequence. If a matching block is found in a frame that has previously been encoded, then rather than encode the current block independently, the location of the matching block and any differences between the current block and the matching block may be encoded. Generally, encoding only the location and any difference information provides a more efficient method of encoding.

A full search block matching algorithm compares the current block that is to be encoded with all possible matches within a search region of a previously encoded frame. The search region is generally defined in terms of motion vectors (MV) that indicate a displacement in location from the upper leftmost pixel of the current block. For example, for a current block that has the upper leftmost pixel at an absolute location in Cartesian coordinates (x, y) of (10, 20), a search region of MV($\pm 5$, $\pm 5$) has corner points at MV(−5, −5), MV(−5, +5), MV(+5, +5) and MV(+5, −5) and is defined by absolute locations (5, 15), (5, 25), (15, 25) and (15, 15) in the previously encoded frame. The full search algorithm always finds the best matching video block since it examines all choices in the search region. Therefore, the full search algorithm provides optimal video quality. The problem with the full search algorithm is that it is computation intensive. For example, for a search region of MV($\pm 48$, $\pm 31$), 6111 comparisons are necessary.

A hierarchical full search algorithm uses two search regions with different search point displacement patterns. The first region has a one pixel search point displacement pattern, i.e. comparison are made at intervals of one pixel. This search point displacement is the same as for the full search algorithm. The second region has a two pixel search point displacement pattern, i.e., comparison are made at every other pixel in both the horizontal and vertical directions. The first region is defined by MV($\pm 2$, $\pm 2$) The second region is defined by MV($\pm 6$, $\pm 6$) minus MV($\pm 2$, $\pm 2$). The hierarchical full search algorithm reduces the number of comparisons over the full search algorithm and maintains adequate video quality, but is still quite computation intensive, especially for large search regions. Extending the hierarchical algorithm to cover a search region of MV($\pm 48$, $\pm 31$) still requires approximately 1695 comparisons.

Another known block matching algorithm uses a very dense displacement pattern around MV(0, 0) and radially decreases the number of comparison points to cover a search region of approximately MV($\pm 10$, $\pm 10$). The problem with this algorithm is that it is not readily extendible to larger search regions in the range of MV($\pm 48$, $\pm 31$). Radially decreasing the number of search points causes the distance between comparison points and therefore, the location of comparison points to be highly irregular. This makes an implementation in hardware complex if not impossible. In addition, as the number of comparison points is reduced, the probability of finding a suitable match is substantially reduced. This causes inferior video quality.

The known block matching algorithms use a consistent search region and search displacement pattern without regard to the video sequence being encoded. This is problematic in that the search technique that is good for one sequence is not good for another sequence. For example, a video sequence, such as a car race that has fast motion, may require a large search region, but a sequence such as a talking head in a news cast, does not require a large search region.

Therefore, a need exists to restrict the search region and search technique to one that is reasonable in the computations required, but provides adequate video quality. Furthermore a need exists to be able to adapt the search technique to the video scene being encoded.

DESCRIPTION OF A PREFERRED EMBODIMENT

The present invention provides an efficient method for video compression by estimating motion on a video frame by video frame basis. This is accomplished by comparing each video block of a present video frame with comparison video blocks of a previously stored video frame. The comparison video blocks are distributed throughout a region surrounding the video block of the present video frame. In other words, each video block of the present video frame is essentially overlaid on the comparison video blocks of the previously stored video frame to determine where objects in the previously stored video frame have moved to in the present video frame. This overlaying is done in a series of three different comparison densities. The first series of comparisons, which are performed using a high density level (first search point displacement pattern), is done in a region surrounding the video block of the present video frame. The highest density level is used in this region because most objects do not move that much from video frame to video frame, thus it is most probable that a match will be found in this area. The next two series of comparisons are done at respectively lower density levels as the comparison video blocks are positioned further and further away from the video block of the present video frame. Once a reasonable determination of motion has been made, the comparison video block of the previously stored video frame that most closely resembles a video block of the present frame may be used to encode the present video block, thus reducing the total number of computations needed to estimate motion while maintaining good video quality.

Figure 1:
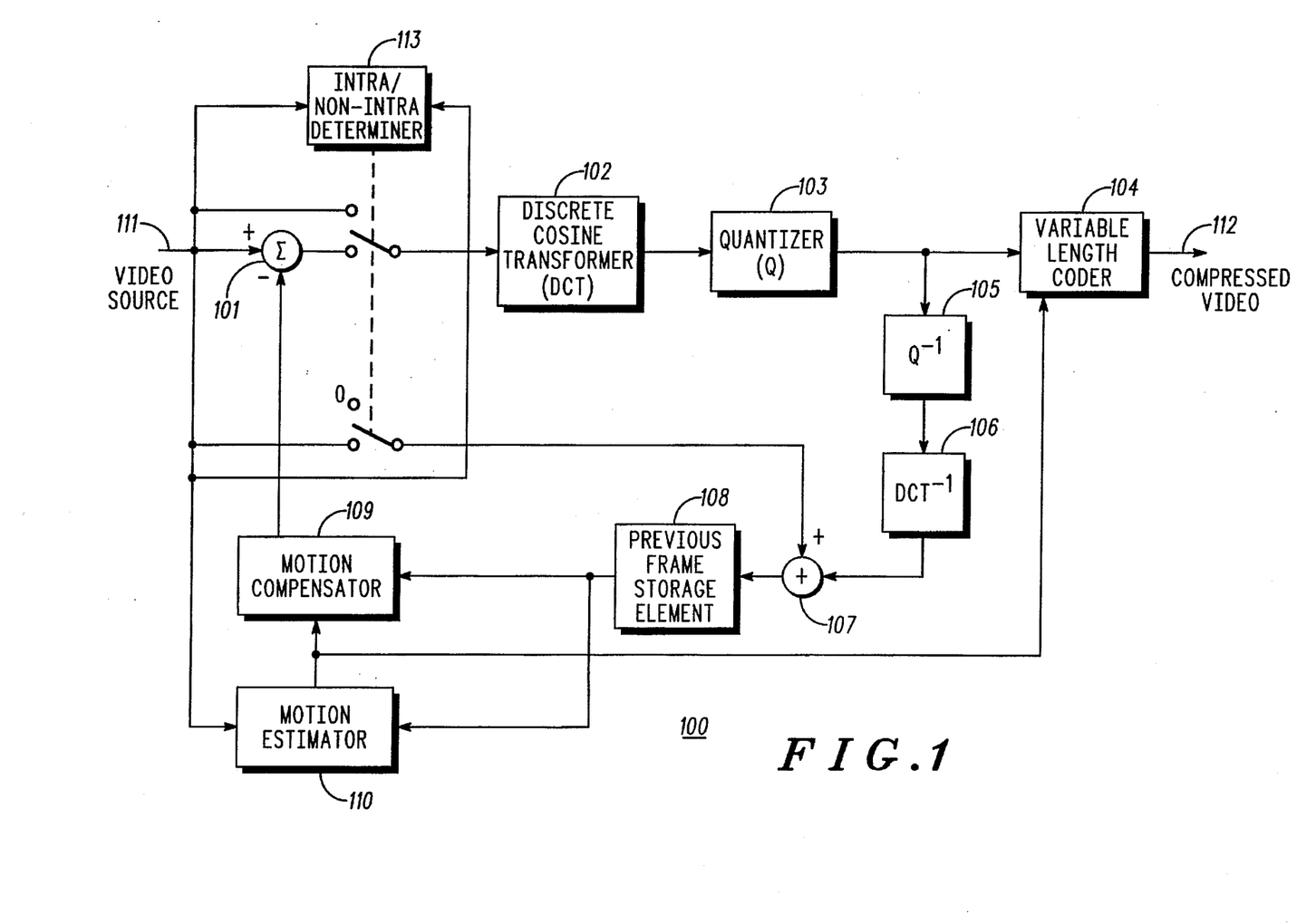
FIG. 1 illustrates a video compression system utilizing motion estimation in accordance with the present invention.

The present invention can be more fully described with reference to FIGS. 1–6. FIG. 1 illustrates a video compression system 100 that estimates motion between video frames in accordance with the present invention. A video source 111 is received by the video compression system 100. For each present video block in the video source 111, the motion estimator 110 searches a previous frame storage element 108, which holds one or more reference pictures, to find a best match video block. The motion estimator 110 then produces a motion vector (MV), which describes the location of the best match video block in relation to the present video block. The motion compensator 109 uses the MV to extract the best match video block from the previous frame storage element 108. The best match video block is then subtracted from the present video block by subtractor 101, producing a residual video block. The intra/non-intra determiner 113 determines whether the residual video block or the present video block should be encoded. This decision is made based on an evaluation of the present video block and the best match video block. If the evaluation is favorable, then non-intra coding is chosen, i.e., the residual video block is encoded. If the evaluation is unfavorable, intra coding is chosen, i.e., the present video block is encoded. In addition to several known methods for determining whether residual video block or the present video block should be encoded, a preferred method is set forth in copending U.S. patent application Ser. No. 08/235,611.

If intra coding is chosen then the present video block is sent to the discrete cosine transformer (DCT) 102 to be encoded. Otherwise, the residual video block is sent to the DCT 102 to be encoded. The DCT 102 then transforms the spatial domain values of the video block it receives into frequency domain values preferably using the discrete cosine transform. Alternatives to the discrete cosine transform include subband coding, lapped orthogonal transforms, and vector quantization.

The frequency domain values from the DCT 102 are then scaled and truncated by the quantizer 103, introducing quantization error into the compression system 100. These quantized values are then efficiently and losslessly encoded by the variable length coder (VLC) 104. The MV's are also efficiently and losslessly encoded by the VLC 104. The output of the VLC 104 is the compressed video 112 that may be stored or transmitted to a decompression system. A feedback loop consisting of an inverse quantizer 105, an inverse DCT 106, an adder 107, the previous frame storage element 108, and the motion compensator 109, reconstructs the same picture that the decompression system will reconstruct and stores the picture into the previous frame storage element 108. The inverse quantizer 105 followed by the inverse DCT 106 reconstructs the spatial domain values, which include the error introduced by the quantizer 103. If non-intra coding was chosen by the intra/non-intra determiner 113, then the best match video block from the motion compensator 109 is added to the output of the inverse DCT 106 by the adder 107; otherwise zero is added to the output of the inverse DCT 106 by the adder 107. The output of the adder 107 is then stored into the previous frame storage element 108. The video compression system 100 may be implemented with software executing on one or more digital signal processors or general purpose microprocessors.

Figure 2:
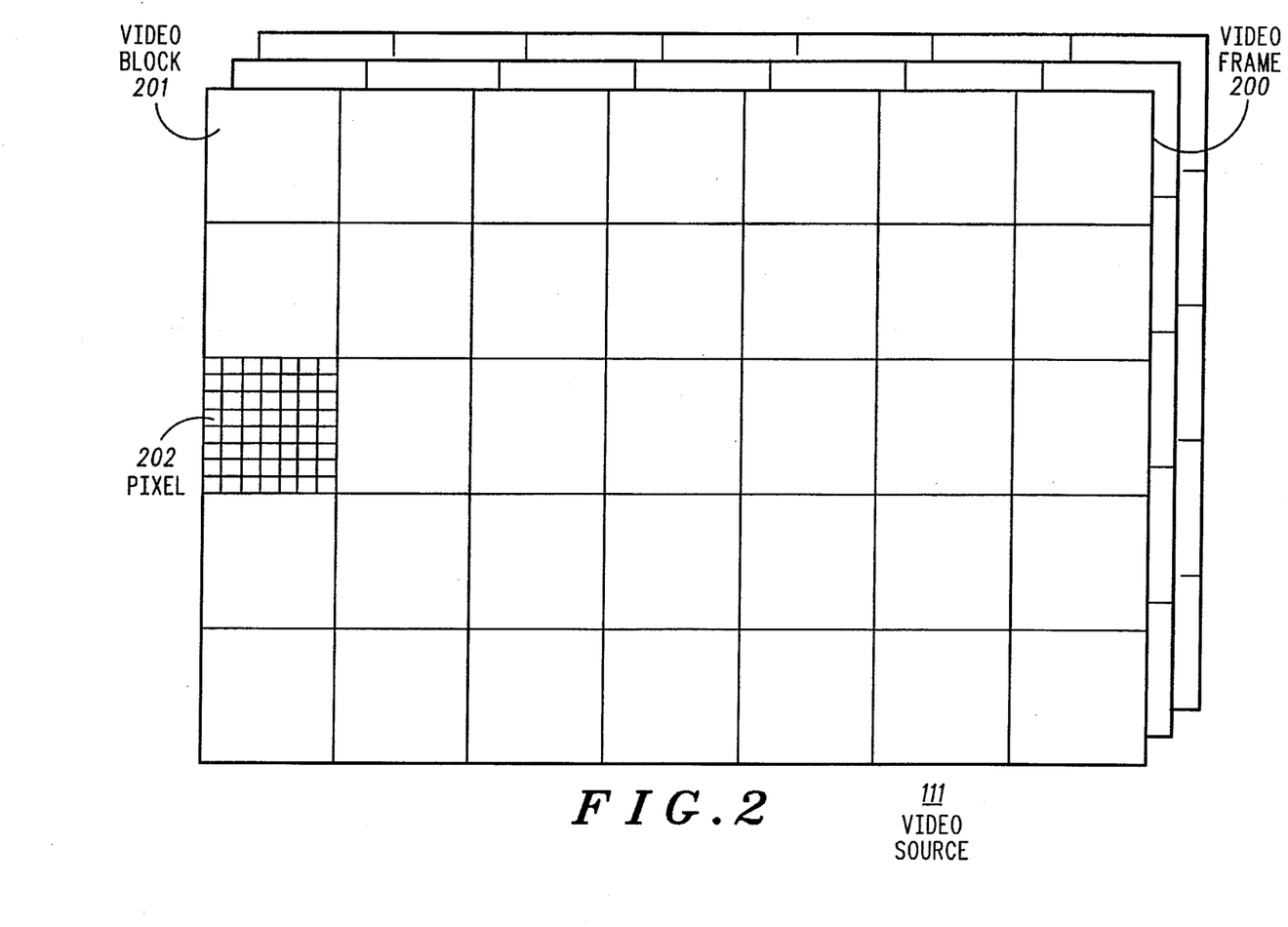
FIG. 2 illustrates an exemplary video source that serves as input for a video compression system implemented in accordance with the present invention.

FIG. 2 illustrates an exemplary video source 111. The video source 111 consists of a series of video frames 200. Each video frame 200 is composed of a two-dimensional array of pixels 202. Common sizes for the video frame 200 include 352 pixels horizontally by 240 pixels vertically, referred to as Standard Image Format (SIF), 352 by 288 pixels, referred to as Common Interchange Format (CIF), and 176 by 144 pixels, referred to as Quarter CIF (QCIF). The video frames are commonly separated in time by $1/24$, $1/25$, or $1/29.97$ seconds. Each video frame 200 can be divided into regions, where each region is referred to as a video block 201. In the H.261, MPEG-1, and MPEG-2 standards the video block 201 is called a macroblock and consists of a 16 by 16 array of pixels.

Figure 3:
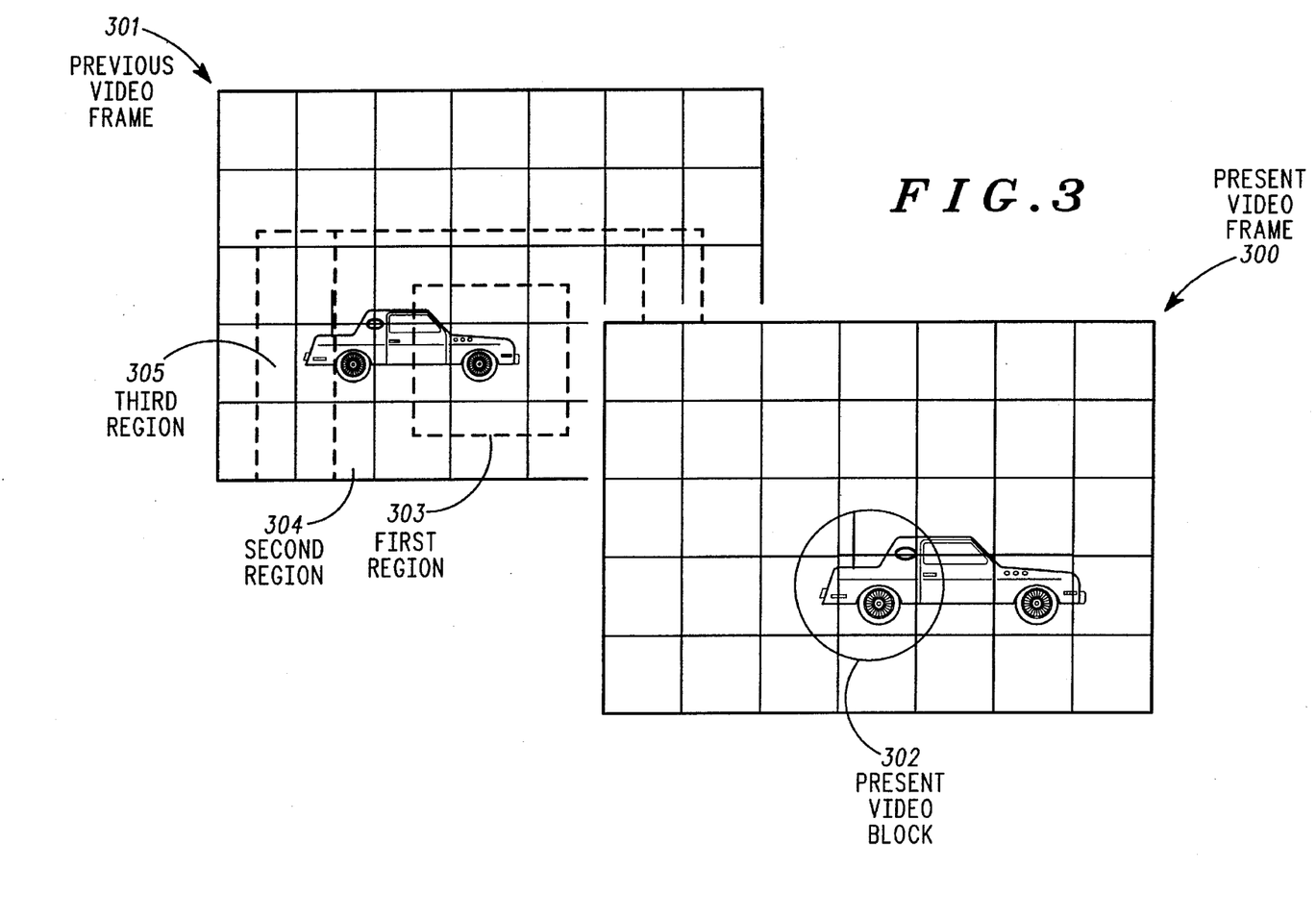
FIG. 3 illustrates two exemplary video frames indicating regions for motion estimation in accordance with the present invention.

FIG. 3 illustrates a present video frame 300 and a previous video frame 301. The motion estimator 110 determines the motion of the present video block 302 from the previous video frame 301 to the present video frame 300 by searching three regions 303, 304, 305 of the previous video frame 301 around the location of the present video block 302. The shape of the three regions 303, 304, 305 are based on the MV probability distribution for typical video sources 111. A high percentage of MV's are near zero, i.e., very little motion, so the first region 303 provides a dense search point displacement pattern to make sure that an excellent estimate is made for most of the MV's. The second region 304 provides a moderately dense search point displacement pattern to attempt to provide a good estimate for the MV's which fall outside of the first region 303, i.e., moderate motion. Since camera pans can introduce fast motion and are predominantly in the horizontal direction, the third region 305 extends the motion estimation search horizontally.

A preferred boundary for the first region 303 is the MV region with the corner points MV(x, y)=(−7, −7), (−7, +7), (+7, +7), and (+7, −7). A preferred boundary for the second region 304 is the MV region with the corner points MV(x, y)=(−31, −31), (−31, +31), (+31, +31), and (+31, −31) and the corner points MV(x, y)=(−7, −7), (−7, +7), (+7, +7), and (+7, −7). A preferred boundary for the third region 305 is the MV region with the corner points MV(x, y)=(−48, −31), (−48, +31), (−31, +31), and (−31,−31) and the corner points MV(x, y)=(+31, −31), (+31, +31), (+48, +31), and (+48, −31).

Figure 4:
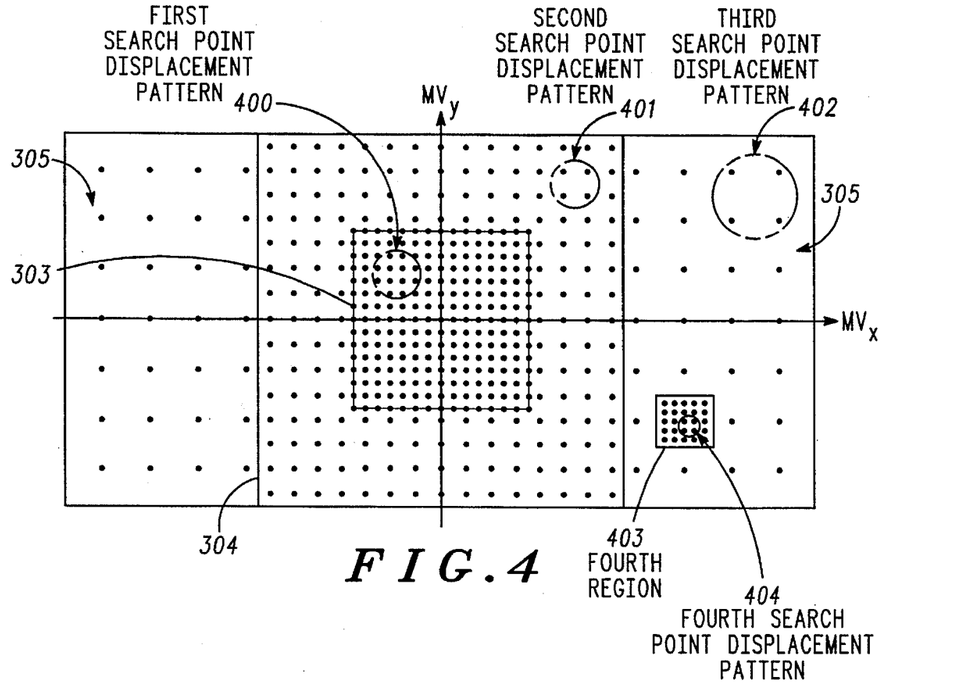
FIG. 4 illustrates example search point displacement patterns and regions in accordance with the present invention.

FIG. 4 illustrates preferred search point displacement patterns for the search regions 303, 304, 305. Within each search region a different search point displacement pattern is used. A search point is a specific MV for which the corresponding comparison video block of the previous video frame 301 is compared to the present video block 302 of the present video frame 300. The search point displacement pattern is a two-dimensional spatial pattern of search points. A first search point displacement pattern 400 is used within the first region 303. This displacement pattern should be very dense to ensure that an excellent estimation is made in the case of the highly probable small motion. The preferred pattern is a rectangular grid of search points spaced one pixel apart.

A second search point displacement pattern 401 is used within the second region 304. This displacement pattern should be moderately dense to ensure that a very good estimation is made for most occurrences of the less probable moderate motion. By using this pattern, some savings in computation is made while not affecting the perceived quality of the compressed video. The preferred pattern is a rectangular grid of search points spaced 2 pixels apart.

A third search point displacement pattern 402 is used within the third region 305. Exploiting the facts that high motion tends to blur the image on the camera and that the human observer is less sensitive to resolution in fast moving objects, this displacement pattern can be less dense. By using a low density pattern, significant savings in computation is made, while providing good quality compressed video for video source 111 with fast horizontal motion. A preferred pattern is a rectangular grid of search points spaced 3 pixels apart. Alternate preferred patterns include a rectangular grid of search points spaced by 3 pixels horizontally and 2 pixels vertically, a rectangular grid of search points spaced by 4 pixels horizontally and 2 pixels vertically, a rectangular grid of search points spaced by 2 pixels horizontally and 4 pixels vertically, and a diamond-shaped grid of search points spaced by $(8)^{1/2}$ on a 45 degree angle.

A fourth search point displacement pattern 403 is used within a fourth region 404. The fourth region 404 is selected surrounding a first or temporary best match video block as determined from searches of the first three regions 303, 304, 305. The fourth search point displacement pattern 403 should be very dense to hone in on the best match video block. The preferred pattern is a rectangular grid of search points spaced 0.5 pixels apart.

Figure 5:
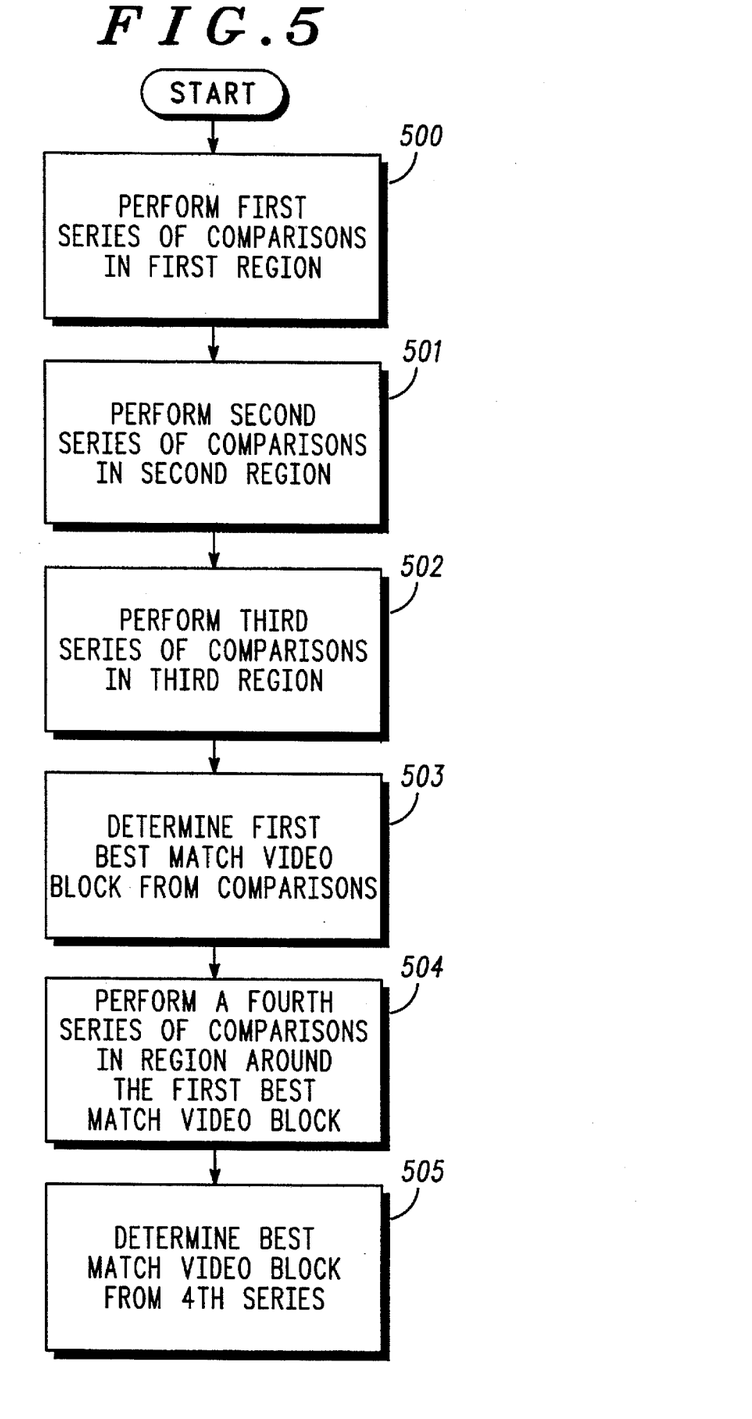
FIG. 5 illustrates a flow diagram of a method for motion estimation in accordance with the present invention.

FIG. 5 illustrates a flow diagram of a preferred implementation of the method of estimating motion. A first series of comparisons is performed in a first region 500. MV's within the first region 303 are selected using the first search point displacement pattern 400. For each selected MV, the corresponding comparison video block of the previous video frame 301 is compared to the present video block 302 using a predetermined comparison measurement criteria. Typically the predetermined comparison measurement criteria is either the mean square error (MSE) or mean absolute difference (MAD) between the comparison video block and the present video block 302. The preferred comparison measurement criteria is the MAD. If the comparison measurement is better than the previous best comparison measurement, then the new MV and its comparison measurement are stored.

Then a second series of comparisons is performed in a second region 501. MV's within the second region 304 are selected using the second search point displacement pattern 401. For each selected MV, the corresponding comparison video block of the previous video frame 301 is compared to the present video block 302 using the predetermined comparison measurement criteria. If the comparison measurement is better than the previous best comparison measurement, then the new MV and its comparison measurement are stored.

Similarly, a third series of comparisons is performed in a third region 502. MV's within the third region 304 are selected using the third search point displacement pattern 402. For each selected MV, the corresponding comparison video block of the previous video frame 301 is compared to the present video block 302 using a predetermined comparison measurement criteria. If the comparison measurement is better than the previous best comparison measurement, then the new MV and its comparison measurement are stored. After the first three comparisons, the MV with the best comparison measurement is used to determine the first or temporary best match video block from the previous video frame 503.

A fourth series of comparisons is performed for MV's within a region around the first best match video block 504. This step is optional, but preferred. A preferred boundary for this region is the MV region with the corner points MV(x, y)=(mvx−1, mvy−1), (mvx−1, mvy+1), (mvx+1, mvy+1), and (mvx+1, mvy−1), where mvx and mvy are the x and y components of the best MV determined in step 503. A very dense search point displacement pattern is used within this region. A preferred search point displacement pattern is 0.5 pixels horizontally and 0.5 pixels vertically. For each MV in this search point displacement pattern, the corresponding comparison video block of the previous video frame 301 is compared to the present video block 302 using the predetermined comparison measurement criteria. If the comparison measurement is better than the previous best comparison measurement, then the new MV and its comparison measurement are stored. Finally, the MV with the best comparison measurement is used to determine the best match video block 505.

Figure 6:
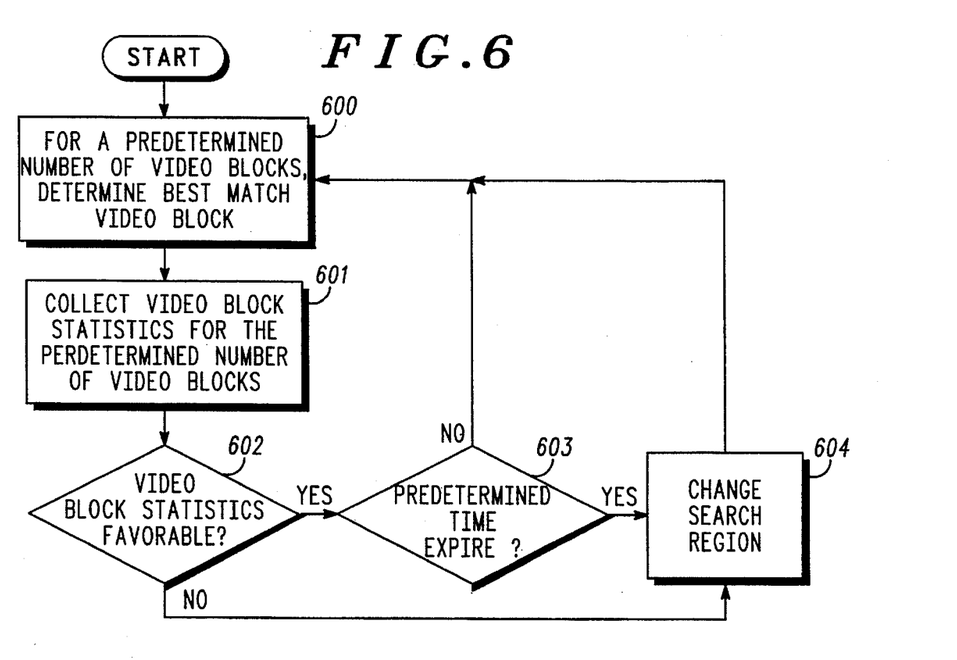
FIG. 6 illustrates a flow diagram for a method for adapting the search region used in motion estimation in accordance with the present invention.

FIG. 6 illustrates a flow diagram of a preferred implementation of a method for adapting the search region. First the best match video blocks are determined for a predetermined number of video blocks from the video source 600. The method illustrated in FIG. 5 may be used to determine the best match video block for each current video block. The predetermined number of video blocks could be anywhere from one video block to an entire video frame of video blocks, with a preferred number equal to one row of video blocks. For example, the predetermined number of video blocks for a SIF-sized video source 111, could be from 1 to 330, with a preferred number of 22.

After determining the best match video blocks for the predetermined number of video blocks 600, video block statistics are collected for the predetermined number of video blocks 601. The preferred set of statistics include intra-count, edge-count, and outer-zone-count. The intra-count statistic is the number of video blocks, within the predetermined number of video blocks, that the intra/non-intra determiner 113 chose to encode using intra coding. The edge-count statistic is the number of video blocks, within the predetermined number of video blocks, whose best match video block corresponded to a MV "near the edge" of the search region. "Near the edge" means within a predetermined number of pixels from the edge of the search region. In a preferred implementation, a MV within one pixel of the edge is considered "near the edge". The outer-zone-count statistic is the number of video blocks, within the predetermined number of video blocks, whose best match video block corresponded to a MV in the "outer zone" away from the center of the search region. The "outer zone" is the sub region within the current search region which is outside of the next smaller defined search region.

The video block statistics are evaluated to determine if they are favorable 602. In a preferred implementation, each statistic is compared to a predetermined threshold value. The intra-count value is unfavorable if it exceeds some threshold. A high intra-count value indicates that the best match video blocks are not being used and therefore, the best match video blocks are of poor quality. The edge-count value is unfavorable if it exceeds some threshold. The outer-zone-count value is unfavorable if it is less than some threshold. Preferred values for a SIF video source for the intra-count threshold, the edge-count threshold, and the outer-zone-count threshold are respectively 3, 2, and 6. If all the video statistics are found to be favorable, then whether a predetermined time has expired is checked 603; otherwise if the video statistics are found to be unfavorable, then the search region is changed 604.

The time since the search region was last changed is compared to a predetermined time 603. If the predetermined time has expired, then the search region is changed 604; otherwise if the predetermined time has not expired, then the search region is not changed and step 600 is performed. The preferred predetermined time for a SIF video source is 88 video blocks. This is 4 times the preferred predetermined number of video blocks used in step 600.

The search region and search point displacement pattern are changed based on whether the video block statistics are unfavorable or whether the predetermined time has expired 604. In a preferred implementation, if the intra-count is unfavorable, the edge-count is unfavorable, or the predetermined time has expired, then the search region area is increased. If the outer-zone-count is unfavorable; then the search region area is decreased. If the area of the search region is increased, then the density of the search point displacement patterns may be decreased, so that the total number of search points is approximately the same. Conversely, if the search region is decreased, the search point displacement patterns may be increased. Keeping the computations per second nearly constant allows an efficient, reconfigurable hardware implementation to handle the different search patterns.

In a preferred implementation there are 3 predetermined search patterns, Pattern A, Pattern B, and Pattern C. Either of the patterns may be chosen in step 604. Pattern A has a first region determined by the MV region with the corner points MV(x, y)=(±7, ±7), and a second region determined by the MV region with the corner points MV(x, y)=(±31, ±31) minus the first region. The first search point displacement pattern, which is used in the first region, is a rectangular grid of search points spaced 1 pixel apart. The second search point displacement pattern, which is used in the second region, is a rectangular grid of search points spaced 2 pixel apart. Pattern B has a first region determined by the MV region with the corner points MV(x, y)=(±7, ±7), a second region determined by the MV region with the corner points MV(x, y)=(±20, ±20) minus the first region, and a third region determined by the MV region with the corner points MV(x, y)=(±48, ±31) minus both the first and second regions. The first search point displacement pattern, which is used in the first region, is a rectangular grid of search points spaced 1 pixel apart. The second search point displacement pattern, which is used in the second region, is a rectangular grid of search points spaced 2 pixel apart. The third search point displacement pattern, which is used in the third region, is a rectangular grid of search points spaced 3 pixel apart. Pattern C has a first region determined by the MV region with the corner points MV(x, y)=(±7, ±7) and a second region determined by the MV region with the corner points MV(x, y)=(±48, ±31) minus the first region. The first search point displacement pattern, which is used in the first region, is a rectangular grid of search points spaced 1 pixel apart. The second search point displacement pattern, which is used in the second region, is a rectangular grid of search points spaced 3 pixel apart.

With the present invention, adaptable and efficient motion estimation is accomplished. The present invention is much less complex than full search and hierarchical search methods, yet provides good video quality. For example, for a search region of MV(±48, ±31), the present invention requires only 1389 comparisons, which is a 77% savings in computations when compared with a full search algorithm, and a 18% savings in computations when compared with a hierarchical search algorithm. In addition, the present invention allows the search region to adjust to the video sequence being encoded while keeping the number of computations fairly constant.

We claim:

1. A method for estimating motion within a video sequence, the method comprising the steps of:

a) performing a first series of comparisons between a present video frame and a comparison video block of a previously stored video frame, wherein, for each comparison of the first series of comparisons, the comparison video block is incrementally positioned within a first region of the previously stored video frame based on a first region of the previously stored video frame based on a first search point displacement pattern;

b) performing a second series of comparisons between the present video block and the comparison video block, wherein, for each comparison of the second series of comparisons, the comparison video block is incrementally positioned within a second region of the previously stored video frame based on a second search point displacement pattern, and wherein the second search point displacement pattern is greater than the first search point displacement pattern;

c) performing a third series of comparisons between the present video block and the comparison video block, wherein, for each comparison of the third series of comparisons, the comparison video block is incrementally positioned within a third region of the previously stored video frame based on a third region of the previously stored video frame based on a third search point displacement pattern is greater than the second search point displacement pattern; and d) from the first series of comparisons, the second series of comparisons and the third series of comparisons, determining a match video block, further comprising establishing the first region, the second region, and the third region of the previously stored video frame to have a rectangular geometry.

2. In the method of claim 1, step (a) further comprises incrementing the first search point displacement pattern by 1 pixel.

3. In the method of claim 1, step (b) further comprises incrementing the second search point displacement pattern by 2 pixels.

4. In the method of claim 1, step (c) further comprises incrementing the third search point displacement pattern by 3 pixels.

5. The method of claim 1 further comprises formatting the first region to have at least a 10×10 pixel area, formatting the second region encircling the first region to have at least a 40×40 pixel area, and formatting the third region encircling the second region to have at least a 40×60 pixel area.

6. In the method of claim 1, step (d) further comprises the steps of:

A) performing a fourth series of comparisons between the present video block and the comparison video block, wherein for each comparison of the fourth series of comparisons, the comparison video block is incrementally positioned within a region surrounding the match video block based on a fourth search point displacement pattern, and wherein the fourth search point displacement pattern is equal to or smaller than the search point displacement of the first search point displacement pattern; and B) determining a best match video block from the fourth series of comparisons.

7. In the method of claim 6, step (1) further comprises incrementing the fourth search point displacement pattern by 0.5 pixels.

8. A method for compressing video, the method comprising the steps of:

a) receiving a present video frame that includes a plurality of video blocks for each video block of the plurality of video blocks;

b) performing a first series of comparisons between the each video block of the present video frame and a comparison video block of a previously stored video frame, wherein, for each comparison of the first series of comparison video block is incrementally positioned within a first region of the previously stored video frame based on a first search point displacement pattern;

c) performing a second series of comparisons between the each video block and the compassion video block, wherein, for each comparison of the second series of comparisons, the comparison video block is incrementally positioned within a second region of the previously stored video frame based on a second search point displacement pattern, and wherein the second search point displacement pattern is greater that the first search point displacement pattern;

d) performing a third series of comparisons between the each video block and the comparison video block, wherein, for each comparison of the third series of comparisons, the comparison video block is incrementally positioned within a third region of the previously stored video frame based on a third search point displacement pattern, and wherein the third search point displacement pattern is greater than the second search point displacement pattern;

e) from the first series of comparisons, the second series of comparisons, and the third series of comparisons, determining a best match video block;

f) subtracting the best match video block from the each video block to produce a residual video block;

g) evaluating the best match video block based on the each video block; and h) encoding the residual video block when the evaluation is favorable, further comprising encoding the each video block when the evaluation is not favorable, and wherein step (e) comprises the steps of:

e1) determining a first best match video block from the first series of comparisons, the second series of comparisons and the third series of comparisons;

e2) performing a fourth series of comparisons between the each video block and the comparison video block, wherein for each comparison of the fourth series of comparisons, the comparison video block is incrementally positioned within a region surrounding the first best match video block based on a fourth search point displacement pattern, and wherein the fourth search point displacement pattern is equal to or smaller than the search point displacement of the first search point displacement pattern; and e3) determining the best match video block from the fourth series of comparisons.

* * * * *